United States Patent
Matsuo et al.

(10) Patent No.: US 7,199,079 B2
(45) Date of Patent: *Apr. 3, 2007

(54) PURIFICATION CATALYST FOR EXHAUST GAS, PRODUCTION METHOD THEREFOR, AND PURIFICATION CATALYST DEVICE FOR AUTOMOBILE EXHAUST GAS

(75) Inventors: Yuichi Matsuo, Wako (JP); Atsushi Furukawa, Wako (JP); Norihiko Suzuki, Wako (JP); Kazunori Kiguchi, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 11/039,032

(22) Filed: Jan. 20, 2005

(65) Prior Publication Data
US 2005/0187099 A1  Aug. 25, 2005

(30) Foreign Application Priority Data
Jan. 21, 2004  (JP)  ............................. 2004-012860

(51) Int. Cl.
*B01J 23/00* (2006.01)
*B01J 21/00* (2006.01)
*B01J 20/00* (2006.01)

(52) U.S. Cl. .............. 502/333; 502/111; 502/327; 502/339; 502/355; 502/415; 502/439; 502/525

(58) Field of Classification Search ............... 502/111, 502/327, 333, 339, 415, 439, 525, 355
See application file for complete search history.

(56) References Cited

U.S. PATENT DOCUMENTS

| | | | | |
|---|---|---|---|---|
| 3,367,888 A | * | 2/1968 | Hoekstra | ............... 502/334 |
| 3,931,054 A | * | 1/1976 | Lester | ............... 502/332 |
| 4,110,254 A | * | 8/1978 | Lauder | ............... 502/303 |
| 4,110,258 A | | 8/1978 | Lauder | |
| 4,127,510 A | | 11/1978 | Harrison et al. | |
| 4,182,694 A | | 1/1980 | Lauder | |
| 4,200,554 A | | 4/1980 | Lauder | |
| 4,492,769 A | | 1/1985 | Blanchard et al. | |
| 4,624,940 A | * | 11/1986 | Wan et al. | ............... 502/251 |
| 4,708,946 A | * | 11/1987 | Ohata et al. | ............... 502/304 |
| 4,849,398 A | * | 7/1989 | Takada et al. | ............... 502/303 |
| 4,921,829 A | | 5/1990 | Ozawa et al. | |
| 4,923,842 A | * | 5/1990 | Summers | ............... 502/261 |
| 5,057,482 A | * | 10/1991 | Fukuda et al. | ............... 502/303 |

(Continued)

FOREIGN PATENT DOCUMENTS

JP  03-068451  3/1991

(Continued)

*Primary Examiner*—Cam N. Nguyen
(74) *Attorney, Agent, or Firm*—Hamre, Schumann, Mueller & Larson, P.C.

(57) ABSTRACT

A purification catalyst for exhaust gas enhances the activities of the precious metals, preventing decrease of activities at high temperature, and exhibiting a satisfactory performance during operation. In the purification catalyst of the present invention, Pd is supported by an aluminum composite oxide having a perovskite structure, the aluminum composite oxide is $LnAl_{1-x}M_xO_3$ in which Ln is a rare-earth element, and the element M in the $LnAl_{1-x}M_xO_3$ is one of elements in groups 1 to 5 and groups 12 to 14.

3 Claims, 2 Drawing Sheets

U.S. PATENT DOCUMENTS

| | | | |
|---|---|---|---|
| 5,064,803 A * | 11/1991 | Nunan | 502/170 |
| 5,494,878 A * | 2/1996 | Murakami et al. | 502/304 |
| 5,691,263 A | 11/1997 | Park et al. | |
| 5,910,466 A | 6/1999 | Yamashita et al. | |
| 5,977,017 A | 11/1999 | Golden | |
| 6,043,188 A * | 3/2000 | Yeo | 502/333 |
| 6,069,111 A * | 5/2000 | Yamamoto et al. | 502/333 |
| 6,090,744 A | 7/2000 | Koda et al. | |
| 6,569,803 B2 * | 5/2003 | Takeuchi | 502/328 |
| 6,576,200 B1 | 6/2003 | Yamamoto et al. | |
| 6,893,998 B2 | 5/2005 | Shigapov et al. | |

FOREIGN PATENT DOCUMENTS

| | | |
|---|---|---|
| JP | 5-86259 | 4/1993 |
| JP | 06-100319 | 4/1994 |
| JP | 06-246155 | 9/1994 |
| JP | 09-215924 | 8/1997 |
| JP | 10-180110 | 7/1998 |
| JP | 2003-175337 | 6/2003 |

* cited by examiner a=b≠c a=b=c

PURIFICATION CATALYST FOR EXHAUST GAS, PRODUCTION METHOD THEREFOR, AND PURIFICATION CATALYST DEVICE FOR AUTOMOBILE EXHAUST GAS

BACKGROUND OF THE INVENTION

1. Field of the Invention

The present invention relates to a purification catalyst for exhaust gas, to a production method therefor, and to a purification catalyst device for automobile exhaust gas, and specifically relates to a production technique for a purification catalyst for exhaust gas in which nitrogen oxides (NOx), carbon hydride (HC), and carbon monoxide (CO) contained in an exhaust gas emitted from an internal combustion engine of an automobile or the like during operation can be simultaneously and effectively purified, whereby the amount of exhaust gas is reduced.

2. Related Art

For purifying exhaust gas containing, for example, CO, HC, NO, and $NO_2$, precious metals (Pt, Rh, Pd and Ir) exhibit high performance. Therefore, it is preferable to employ the above-mentioned precious metals in a purification catalyst for exhaust gas. These precious metals are generally mixed with or supported by $Al_2O_3$ which is a support material having high surface-to-weight ratio together with additives such as La, Ce, and Nd. On the other hand, composite oxides (for example, a perovskite oxide), made by combining various elements, have extremely varied properties. Therefore, it is preferable for a purification catalyst for exhaust gas to employ the above-mentioned composite oxides. Moreover, when the precious metal is supported on the composite oxides, the properties of the precious metal are significantly changed. From this point of view, a preferable performance for purifying exhaust gas can be obtained in the purification catalyst for exhaust gas in which a precious metal is supported on a composite oxide.

Various catalysts mentioned above are now being developed, and for example, a technique in which the rate of coalescence of the precious metal can be reduced by making a perovskite be a support, judging from deterioration of the precious metal with reduction of active sites by coagulation of the precious metal, is proposed (see Japanese Unexamined Application Publication No. 5-86259). Moreover, another technique in which reduction of PdO can be decreased by using a perovskite in which the A site is defective, in view of reducing PdO which is an active species in a NO reduction reaction, whereby the PdO is changed to Pd, which is low-activity Pd, when the precious metal is Pd, is proposed (see Japanese Unexamined Application Publication No. 2003-175337).

Conventional purification catalysts for exhaust gas exhibit satisfactory performance for reducing CO, HC, and NOx (NO, $NO_2$, etc.) contained in exhaust gas, in the initial running of a vehicle. However, the conventional catalysts cannot exhibit satisfactory performance for reducing CO, HC, and NOx, after running for long periods or an exposure to high temperature conditions.

As mentioned above, a reason that sufficient performance for purifying the exhaust gas cannot be obtained after running for long periods or an exposure to high temperature conditions is as follows. That is, in the conventional purification catalyst for exhaust gas, a precious metal, for example, Pt, Rh, or Pd, is supported on $Al_2O_3$ having a high surface-to-weight ratio. Due to the high surface-to-weight ratio of the $Al_2O_3$, the precious metal is advantageously supported in a highly dispersed condition. However, $Al_2O_3$ is a stable compound and does not mutually affect a supported precious metal, whereby activity of the precious metal is not improved. This is why the $Al_2O_3$ has an extremely stable surface, whereby $Al_2O_3$ does not electrically affect and interact with the precious metal. Accordingly, satisfactory performance cannot be obtained after running for long periods or exposure to high temperature conditions.

Moreover, the reason that endurance of the $Al_2O_3$ is low is as follows. That is, decreases in the activity thereof occur due to decrease of active sites with the coagulation of the precious metals, specifically Pd based on the deterioration form of the catalyst containing the precious metals, and by degradation and reduction of PdO whose oxide state is highly active. Due to the extremely stable surface of the $Al_2O_3$, $Al_2O_3$ does not have an effect of decreasing the mobility of Pd for the precious metal during the running of an automobile, and does not have an effect of stabilizing the oxide state of the PdO at the surface, whereby the decreasing of the activity cannot be suppressed.

SUMMARY OF THE INVENTION

The present invention was made in light of the above demands, and it is therefore an object of the present invention to provide a purification catalyst for exhaust gas, in which activity of the precious metal is improved, and reduction in activity after endurance running at high temperatures or for long periods of time is prevented, and a production method therefor, and a purification catalyst device for automobile exhaust gas.

The present inventors have intensively researched purification catalysts for exhaust gas, in which activity of the precious metal is improved, and decreases in the activity after exposure to high temperature conditions (high temperature endurance) are prevented. As a result, the present inventors have found that, by setting Al composite oxide to be $LnAl_{1-x}M_xO_3$ (Ln is a rare earth element) in the case of supporting Pd on a support of perovskite Al composite oxide obtained by baking a precursor salt of carboxylic complex polymer, reduction of PdO to Pd can be suppressed, whereby high activity in operation after exposure to high temperature conditions can be maintained. Moreover, in the above-mentioned purification catalysts for exhaust gas, the present inventors have found that, by solving an element whose ion diameter is different from that of Al in a B site in the perovskite, distortion of the crystal structure occurs, an electrical instability is increased, whereby interaction of the supported Pd and the perovskite is increased, resulting in obtaining a high activity. Furthermore, the present inventors have found that by setting the element M in the $LnAl_{1-x}M_xO_3$ (Ln is a rare-earth element) to be an element in groups 1 to 5 and groups 12 to 14, that is, by solving an alkali metal, an alkaline-earth metal, a rare-earth actinoid, a titanium group element, a vanadium group element, a zinc group element, a boron group element, or a carbon group element at the B site of the Al composite oxide, the distortion of the crystal structure becomes extreme and an electrical instability is further increased, whereby interaction of the supported Pd and the perovskite is further increased, resulting in the obtaining of a high level of the high activity.

The present invention (a first aspect of the invention) was made in light of the above knowledge. That is, a purification catalyst for exhaust gas of the present invention is a catalyst in which Pd is supported by an aluminum composite oxide having a perovskite structure, and the aluminum composite oxide is $LnAl_{1-x}M_xO_3$ in which Ln is a rare-earth element, and the element M in $LnAl_{1-x}M_xO_3$ is one of elements in groups 1 to 5 and groups 12 to 14. The M in $LnAl_{1-x}M_xO_3$ (Ln is a rare-earth element) includes elements in group 13, excluding Al. Moreover, the inventors have found that by setting the X in $LnAl_{1-x}M_xO_3$ (Ln is a rare-earth element) appropriately, substantial distortion of the crystal structure is generated, and an electrical instability is further increased, whereby interaction of the supported Pd and the perovskite is further increased, resulting in the obtaining of an increased activity.

The present invention (a second aspect of the invention) was made in light of the above knowledge. That is, in the above-mentioned purification catalyst for exhaust gas (as in the first aspect of the invention), it is preferable that X in $LnAl_{1-x}M_xO_3$ in which Ln be a rare-earth element is 0.02 to 0.3 (in the second aspect of the invention).

Furthermore, the present inventors have also found that a $LaAl_{0.8}M_{0.2}O_3$ among Al composite oxides having a perovskite structure is trigonal or rhombohedral, and a large part of a B site in the perovskite is Al, whereby electrical instability is large, and electron fluctuation of PdO bounded on the $LaAl_{0.8}M_{0.2}O_3$ is larger than that of PdO which exists independently. Therefore, the oxidation state of Pd at a surface of the supported PdO is a state of $Pd^{2+}$ over a large area. This state is a preferable state for purifying exhaust gas, whereby high activity can be obtained. Additionally, the present inventors have confirmed that this catalyst can exhibit high activity even after exposing the catalyst to operating conditions of about 1000° C.

The present invention (a third aspect of the invention) was made in light of the above knowledge. That is, in the above-mentioned purification catalyst for exhaust gas (in the first or second aspect of the invention), it is preferable that the aluminum composite oxide be trigonal or rhombohedral (the third aspect of the invention).

In the manufacturing process of $LnAl_{1-x}M_xO_3$ (Ln is a rare-earth element), the inventors have attempted to produce a carboxylic complex polymer by evaporating and solidifying an aqueous nitrate solution or aqueous chloride solution which is a component containing carboxylic acid, and discovered that $LnAl_{1-x}M_xO_3$ is produced in a single phase, and further more that the surface of $LnAl_{1-x}M_xO_3$ easily interacts with PdO when Pd is supported. As a result, a high activity is obtained in the purification catalyst for exhaust gas having Pd supported on $LnAl_{1-x}M_xO_3$.

The present invention (fourth and fifth aspects of the invention) was made in light of the above knowledge. That is, in the above-mentioned purification catalysts for exhaust gas (the first to the third aspects of the invention), it is preferable that at least one kind of compound selected from a group of compounds (carboxylic acid having a hydroxyl group or a mercapto group and having a carbon number of 2 to 20, dicarboxylic acid having a carbon number of 2 or 3, and monocarboxylic acid having a carbon number of 1 to 20) be added to an aqueous nitrate solution or an aqueous chloride solution which is a component, whereby a purification catalyst for exhaust gas is obtained (in the fourth aspect of the invention). Moreover, in the purification catalysts for exhaust gas (in the fourth aspect of the invention), it is preferable that the aqueous nitrate solution or the aqueous chloride solution be evaporated completely to obtain a carboxylic acid complex polymer, and that the carboxylic acid complex polymer be heated, whereby a purification catalyst for exhaust gas is obtained (the fifth aspect of the invention).

As the carboxylic acid having a hydroxyl group or a mercapto group and having a carbon number of 2 to 20, oxycarboxylic acid and a compound in which an oxygen atom in the hydroxyl of the oxycarboxylic acid is replaced with a sulfur atom are mentioned. The carbon number of these carboxylic acids is 2 to 20 in light of solubility in water, is preferably 2 to 12, is more preferably 2 to 8, and is most preferably 2 to 6. Moreover, the carbon number of the monocarboxylic acid is 1 to 20 in light of solubility in water, is preferably 1 to 12, is more preferably 1 to 8, and is most preferably 1 to 6.

Furthermore, as concrete examples of the carboxylic acids having a hydroxyl group or a mercapto group and having a carbon number of 2 to 20, for example, glycolic acid, mercaptosuccinic acid, thioglycolic acid, lactic acid, β-hydroxy propionic acid, malic acid, tartaric acid, citric acid, isocitric acid, allo-citric acid, gluconic acid, glyoxylic acid, glyceric acid, mandelic acid, tropic acid, benzilic acid, and salicylic acid are mentioned. As concrete examples of the monocarboxylic acids, for example, formic acid, acetic acid, propionic acid, butyric acid, isobutyric acid, valeric acid, isovaleric acid, hexanoic acid, heptanoic acid, 2-methyl hexanoic acid, octanoic acid, 2-ethyl hexanoic acid, nonanoic acid, decanoic acid, and lauric acid, etc., are mentioned. In the above-mentioned acids, it is preferable to use acetic acid, oxalic acid, malonic acid, glycolic acid, lactic acid, malic acid, tartaric acid, glyoxylic acid, citric acid, or gluconic acid, and it is more preferable to use oxalic acid, malonic acid, glycolic acid, lactic acid, malic acid, tartaric acid, glyoxylic acid, citric acid, or gluconic acid.

Next, a production method for a purification catalyst for exhaust gas of the present invention (the sixth aspect of the invention) is a method for preferably producing the above-mentioned catalysts (the first to fifth aspects of the invention). That is, the sixth aspect of the invention is a method in which when the purification catalyst for exhaust gas in which Pd is supported on an Al composite oxide ($LnAl_{1-x}M_xO_3$ (Ln is a rare-earth element)), at least one kind of compound selected from a group of compounds (carboxylic acid having a hydroxyl group or a mercapto group and having a carbon number of 2 to 20, a dicarboxylic acid having a carbon number of 2 or 3, and a monocarboxylic acid having a carbon number of 1 to 20) is added to an aqueous nitrate solution or an aqueous chloride solution which is a component, whereby a purification catalyst for exhaust gas is obtained.

In the above-mentioned production method for a purification catalyst for exhaust gas (in the sixth aspect of the invention), it is preferable that the aqueous nitrate solution or aqueous chloride solution be evaporated completely to obtain a carboxylic acid complex polymer, and that the carboxylic acid complex polymer be heated (in the seventh aspect of the invention), and it is more preferable that the heating temperature be not more than 1000° C. (the eighth aspect of the invention).

The above-described purification catalyst for exhaust gas and production method therefor summarize the present invention; however, the inventors have further researched specific applications of the first to eighth aspects of the present invention and found that the purification catalyst for exhaust gas of the present invention is particularly suited for an internal combustion engine for an automobile, and have thereby completed a ninth aspect of the present invention.

The ninth aspect of the present invention is a purification catalyst device for automobile exhaust gas having Pd supported on aluminum composite oxide which is a perovskite for purifying exhaust gas emitted from an automobile, in which the aluminum composite oxide is $LnAl_{1-x}M_xO_3$ in which Ln is a rare-earth element, and the element M in the $LnAl_{1-x}M_xO_3$ is one of elements in groups 1 to 5 and groups 12 to 14.

The purification catalyst for exhaust gas of the present invention in which Pd is supported on Al composite oxide ($LnAl_{1-x}M_xO_3$ (Ln is a rare-earth element)) has a function in which the reduction of PdO to Pd metal can be decreased. The shape of the rare-earth element variously changes in oxide states. For example, when a catalyst made by supporting Pd on $La_2O_3$ is exposed to high temperature conditions, $La_2O_3$ migrates onto the Pd grain from the contact area between Pd and $La_2O_3$, whereby a shape of filling up $La_2O_3$ with Pd is formed, resulting in additional migration of minute amounts of $La_2O_3$ onto the Pd surface (Zhang et al., J. Phys. Chem., Vol. 100, No. 2, pp. 744–754, 1996). Even in the present system (Al composite oxide including rare-earth element), Ln and Pd form a complex compound by this behavior, whereby reduction of PdO to Pd metal can be decreased. Owing to this effect, a purification catalyst for exhaust gas of the present invention can maintain a highly active state even after operating for long periods or an exposure to high temperature conditions.

Moreover, in an Al composite oxide having a perovskite structure, an oxide represented by a rational formula of $LnAl_{1-x}M_xO_3$ (Ln is a rare-earth element) has a structure in which an element whose ion diameter is different from that of Al are solved in a B site in the $LnAl_{1-x}M_xO_3$. In this way, since elements having different ion diameters are solved, a large distortion of crystal structure is generated. Therefore, electrical instability is increased, whereby interaction of the supported Pd and the perovskite is increased, resulting in obtaining the high activity. Additionally, the effect can be specifically demonstrated when the element M in the $LnAl_{1-x}M_xO_3$ is one of elements in groups 1 to 5 and groups 12 to 14.

Furthermore, in the above-mentioned Al composite oxide having a perovskite structure, a characteristic of $LnAl_{0.8}M_{0.2}O_3$, etc., is that the crystal system is trigonal or rhombohedral and most of the B sites of the perovskite are Al. The trigonal system is, as shown in FIG. 1, a crystal system in which an ideal cubic system of a unit lattice is changed in the c-axis direction, and the angle between the a-axis and the b-axis is 120°. That is, the trigonal system is a crystal system in which an ideal cubic system of a perovskite structure is significantly strained. In the crystal system, the electron state among constituent atoms is extremely unstable. In the rhombohedral system, as shown in FIG. 2, the trigonal system is expressed by a different basic axis, and the structure in the rhombohedral system is the same as in the trigonal system. FIG. 3 is an XRD spectrum as data demonstrating the difference in crystal systems of $LaAl_{0.8}Li_{0.2}O_3$ supporting Pd. That is, by comparing the structures of $LaAl_{0.8}Li_{0.2}O_3$, $LaAl_{0.8}Mg_{0.2}O_3$, $LaAl_{0.8}Sc_{0.2}O_3$, $LaAl_{0.8}Ti_{0.2}O_3$, $LaAl_{0.8}Nb_{0.2}O_3$, $LaAl_{0.8}Zn_{0.2}O_3$, $LaAl_{0.8}Ga_{0.2}O_3$, $LaAl_{0.8}Ge_{0.2}O_3$ and $NdAl_{0.8}Mg_{0.2}O_3$ (which are hereinafter described as the "first group"), and $Al_2O_3$, $GdAl_{0.8}Mg_{0.2}O_3$, $LaAl_{0.8}Mn_{0.2}O_3$ and $LaAl_{0.8}Cu_{0.2}O_3$ (which are hereinafter described as the "second group"), crystal systems of the first group are trigonal or rhombohedral, while the crystal system of the second group are neither trigonal nor rhombohedral, but is orthorhombic, as shown in FIG. 3.

Additionally, in the first group, most of the B sites in the perovskite are Al, whereby the bond between Al and O has a high probability of being a covalent bond. Therefore, some of the dipole moment is generated in a crystal of perovskite which generally has a high probability of being an ionic bond. As described above, the oxides belonging in the first group are trigonal or rhombohedral, and most of the B sites in the perovskite are Al in the oxides, whereby the dipole moment of the oxides belonging in the first group are larger than that of the well-known purification catalyst for exhaust gas, for example $LaFeO_3$.

Due to the dipole moment, an electron fluctuation of PdO adjacent to the Al composite oxides belonging in the first group is larger than that of PdO which exists independently. Therefore, the oxidation state of Pd in a surface of the supported PdO is a state of $Pd^{2+}$ over a large area. There are two oxidation states of Pd in a surface of the PdO, which are a state of $Pd^{2+}$ and a state of $Pd^0$ (metal state). Activity for purification for exhaust gas in the state of $Pd^{2+}$ is higher than that in the state of $Pd^0$. That is, in the purification catalysts for exhaust gas of the present invention in which Pd is supported on the Al composite oxides belonging in the first group, the oxidation state of Pd in a surface of the PdO is in the state of $Pd^{2+}$, whereby the catalysts of the present invention have high activity. Moreover, the catalysts of the present invention can maintain high activity during running even after exposing the catalyst to an operating condition of about 1000° C.

Furthermore, when the $LnAl_{1-x}M_xO_3$ is produced, an aqueous nitrate solution or an aqueous chloride solution of a component containing carboxylic acid is evaporated completely to obtain a carboxylic acid complex polymer, and the polymer is heated at a relatively low temperature of 800° C. or 900° C., whereby $LnAl_{1-x}M_xO_3$ is generated as a single phase. On the other hand, when the $LaAlO_3$, etc., are produced in other ways, for example, solid-phase reaction, $LaAlO_3$ is not generated as a single phase even if the heating at a relatively high temperature of 1700° C. is performed (see Rare Earth Science, Kagaku-Dojin Publishing Company, Inc., Ginya Adachi, p. 564). That is, $LnAl_{1-x}M_xO_3$ of the single phase can be synthesized at the above-mentioned low temperature by using carboxylic acid in light of the structure of the $LnAl_{1-x}M_xO_3$ which is similar to the structure of $LaAlO_3$. Therefore, sufficient surface-to-weight ratio can be obtained and the catalyst can be used in a state in which the surface of the crystal lattice is active. In the purification catalyst for exhaust gas made by supporting Pd on the $LnAl_{1-x}M_xO_3$ by using the method of the present invention, sufficient surface-to-weight ratio and strong interaction between $LnAl_{1-x}M_xO_3$ and Pd can be obtained, whereby high activity can be realized, resulting in superior purification performance and superior endurance.

DETAILED DESCRIPTION OF THE INVENTION

Figure 1:
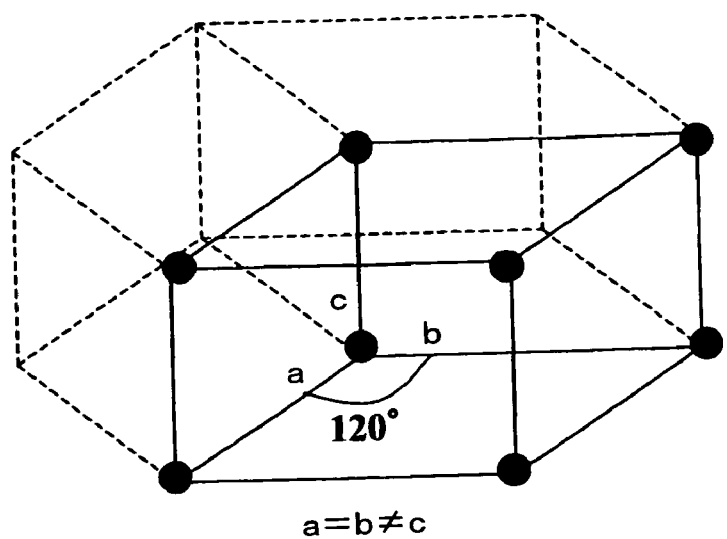
FIG. 1 is a perspective view showing an example of a crystal system (trigonal system) of Al oxide composing a purification catalyst for exhaust gas of the present invention.
Figure 2:
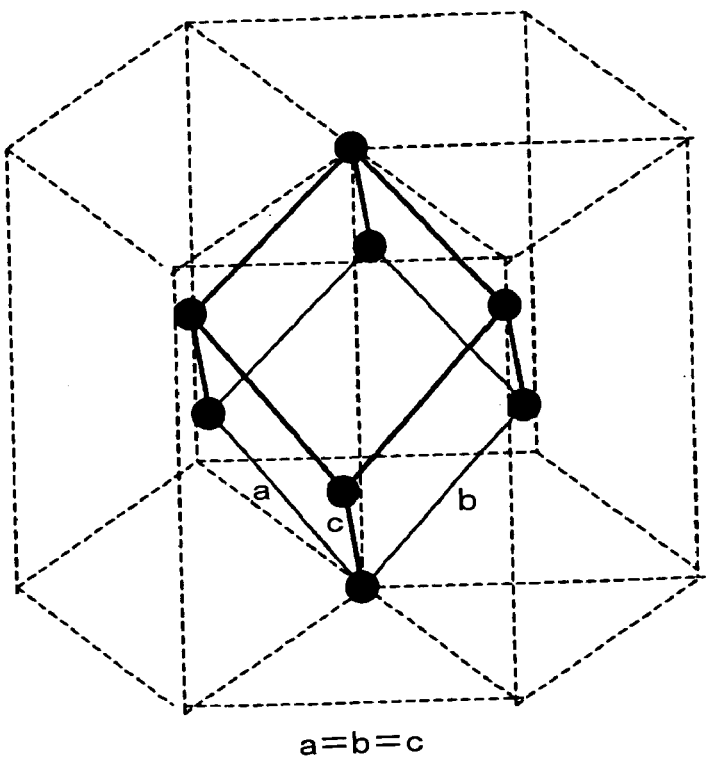
FIG. 2 is a perspective view showing an example of a crystal system (rhombohedral system) of Al oxide composing a purification catalyst for exhaust gas of the present invention.
Figure 3:
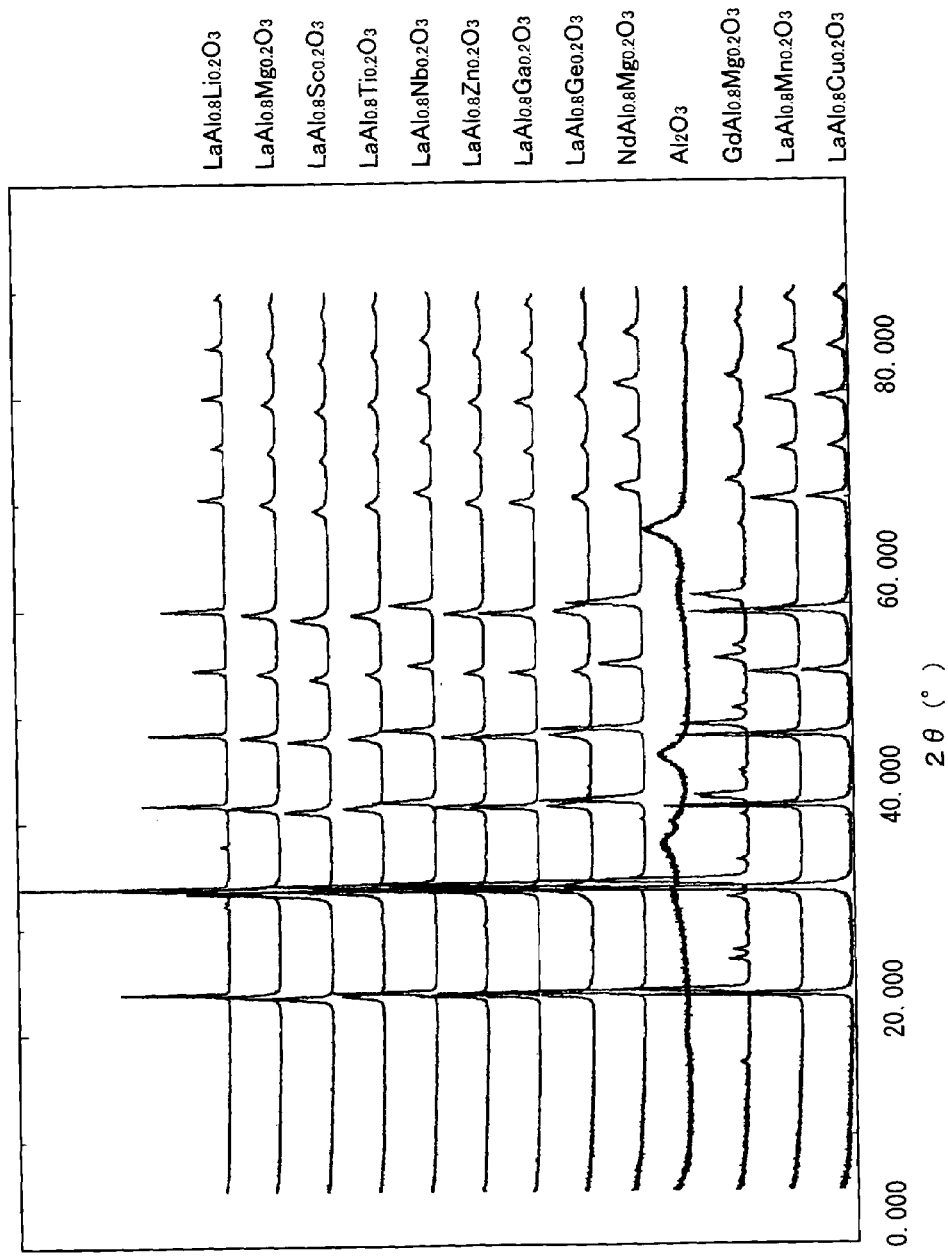
FIG. 3 is an XRD spectrum showing differences in crystal system of various oxides on which Pd is supported.

Hereinafter, the present invention will be concretely explained by way of examples.

MANUFACTURING EXAMPLE 1

Production of Composite Oxides as Support

Predetermined amounts of lanthanum nitrate hexahydrate, magnesium nitrate and aluminum nitrate nonahydrate were dissolved in ion-exchanged water, whereby a mixed solution was obtained. Next, a predetermined amount of malic acid was dissolved in ion-exchanged water, whereby an aqueous malic acid solution was obtained. These two solutions were mixed, the obtained mixed solution was set on a hot plate with a stirrer, and the mixed solution was heated and was agitated at 250° C. by a stirring bar, whereby evaporation of water into water vapor was performed, complete evaporation was performed, and the dried sample was crushed into a powder using a mortar and pestle. The crushed sample was moved to an aluminum crucible, the sample was heated to 350° C. at a rate of 2.5° C./min in a muffle kiln, and a heat treatment was performed at 350° C. for 3 hours. Owing to the heat treatment, a provisional heated substance in which malate and nitrate salt (for example, nitrate-nitrogen) were removed was obtained. After crushing the provisional heated substance into powder and mixing for 15 minutes by a mortar and pestle, the obtained mixture was set in the aluminum crucible again, the sample was heated to 800° C. at a rate of 5° C./min in the muffle kiln, and a heat treatment was performed at 800° C. for 10 hours. Owing to the heat treatment, a composite oxide having a perovskite structure of which the composition was $LaAl_{0.8}Mg_{0.2}O_3$ was obtained.

Support of Precious Metal

An aqueous palladium nitrate solution was prepared by dissolving predetermined amounts of palladium nitrate dihydrate in ion-exchanged water. The aqueous palladium nitrate solution and a predetermined amount of $LaAlO_3$ powder were put in an round-bottom flask, and while evacuating the inside of the flask by a rotary evaporator, the mixture was evaporated and solidified in a hot bath at 60° C. By heating up to 250° C. at a rate of 2.5° C./min in a muffle kiln, the temperature was further raised to 750° C. at a rate of 5° C./min and was held at 750° C. for 3 hours. As a result, a catalyst powder of Manufacturing Example 1 of $Pd/LaAl_{0.8}Mg_{0.2}O_3$ having PdO impregnated and supported on $LaAl_{0.8}Mg_{0.2}O_3$ was obtained.

Estimate of Activity

Next, initial activities and activities after endurance running were estimated for the obtained catalyst powders of the Manufacturing Example 1. The estimation was performed by flowing model exhaust gas of a vehicle into catalysts under conditions in which the A/F (air-fuel ratio) was substantially 14.6 and SV (stroke volume) was 50000 $h^{-1}$. Endurance running was performed for 20 hours at an endurance running temperature of 900° C. by using model exhaust gas in which the A/F (air-fuel ratio) was substantially 14.6. These results are shown in Tables 1 to 4. That is, the Table 1 shows a temperature at which CO, HC, and NO are reduced by 50% in a temperature increase test of catalysts before the endurance running. Moreover, Table 2 shows a purification rate of CO, HC, and NO at 400° C. in a temperature increase test of catalysts before the endurance running. On the other hand, the Table 3 shows a temperature at which CO, HC, and NO are reduced by 50% in a temperature increase test of catalysts after the endurance running. Additionally, Table 2 shows a purification rate of CO, HC, and NO at 400° C. in a temperature increase test of catalysts after the endurance running.

TABLE 1

| | | Temperature at which CO, HC, or NO are Reduced by 50% (° C.) | | |
|---|---|---|---|---|
| | | CO | HC | NO |
| Manufacturing Example 1 | $Pd/LaAl_{0.8}Mg_{0.2}O_3$ | 278 | 290 | 204 |
| Manufacturing Example 2 | $Pd/LaAl_{0.8}Li_{0.2}O_3$ | 258 | 270 | 202 |
| Manufacturing Example 3 | $Pd/LaAl_{0.8}Sc_{0.2}O_3$ | 273 | 284 | 204 |
| Manufacturing Example 4 | $Pd/LaAl_{0.8}Ti_{0.2}O_3$ | 291 | 303 | 206 |
| Manufacturing Example 5 | $Pd/LaAl_{0.8}Nb_{0.2}O_3$ | 251 | 258 | 192 |
| Manufacturing Example 6 | $Pd/LaAl_{0.8}Zn_{0.2}O_3$ | 286 | 295 | 208 |
| Manufacturing Example 7 | $Pd/LaAl_{0.8}Ga_{0.2}O_3$ | 261 | 268 | 206 |
| Manufacturing Example 8 | $Pd/LaAl_{0.8}Ge_{0.2}O_3$ | 284 | 290 | 212 |
| Manufacturing Example 9 | $Pd/NdAl_{0.8}Mg_{0.2}O_3$ | 275 | 288 | 203 |
| Manufacturing Example 10 | $Pd/Al_2O_3$ | 293 | 298 | 314 |
| Manufacturing Example 11 | $Pd/GdAl_{0.8}Mg_{0.2}O_3$ | 298 | 300 | 225 |
| Manufacturing Example 12 | $Pd/LaAl_{0.8}Mn_{0.2}O_3$ | 290 | 297 | 228 |
| Manufacturing Example 13 | $Pd/LaAl_{0.8}Cu_{0.2}O_3$ | 317 | 332 | >400 |
| Manufacturing Example 14 | $Pd/LaAl_{0.8}Mg_{0.2}O_3$ | 301 | 317 | 282 |

TABLE 2

| | | Purification Rate at 400° C. (%) | | |
|---|---|---|---|---|
| | | CO | HC | NO |
| Manufacturing Example 1 | $Pd/LaAl_{0.8}Mg_{0.2}O_3$ | 92.1 | 98.0 | 83.3 |
| Manufacturing Example 2 | $Pd/LaAl_{0.8}Li_{0.2}O_3$ | 94.9 | 99.0 | 90.6 |
| Manufacturing Example 3 | $Pd/LaAl_{0.8}Sc_{0.2}O_3$ | 88.7 | 98.8 | 78.6 |
| Manufacturing Example 4 | $Pd/LaAl_{0.8}Ti_{0.2}O_3$ | 84.2 | 99.0 | 71.7 |
| Manufacturing Example 5 | $Pd/LaAl_{0.8}Nb_{0.2}O_3$ | 91.4 | 98.7 | 85.4 |
| Manufacturing Example 6 | $Pd/LaAl_{0.8}Zn_{0.2}O_3$ | 89.5 | 98.4 | 81.9 |
| Manufacturing Example 7 | $Pd/LaAl_{0.8}Ga_{0.2}O_3$ | 88.4 | 99.0 | 81.9 |
| Manufacturing Example 8 | $Pd/LaAl_{0.8}Ge_{0.2}O_3$ | 82.0 | 98.9 | 71.6 |
| Manufacturing Example 9 | $Pd/NdAl_{0.8}Mg_{0.2}O_3$ | 92.5 | 98.1 | 82.5 |
| Manufacturing Example 10 | $Pd/Al_2O_3$ | 77.7 | 98.5 | 63.2 |
| Manufacturing Example 11 | $Pd/GdAl_{0.8}Mg_{0.2}O_3$ | 88.2 | 98.0 | 72.4 |
| Manufacturing Example 12 | $Pd/LaAl_{0.8}Mn_{0.2}O_3$ | 89.6 | 98.6 | 81.6 |
| Manufacturing Example 13 | $Pd/LaAl_{0.8}Cu_{0.2}O_3$ | 74.8 | 86.3 | 47.5 |
| Manufacturing Example 14 | $Pd/LaAl_{0.8}Mg_{0.2}O_3$ | 81.5 | 97.4 | 66.2 |

TABLE 3

| | | Temperature at which CO, HC, or NO are Reduced by 50% (° C.) | | |
|---|---|---|---|---|
| | | CO | HC | NO |
| Manufacturing Example 1 | $Pd/LaAl_{0.8}Mg_{0.2}O_3$ | 315 | 329 | 314 |
| Manufacturing Example 2 | $Pd/LaAl_{0.8}Li_{0.2}O_3$ | 317 | 329 | 326 |
| Manufacturing Example 3 | $Pd/LaAl_{0.8}Sc_{0.2}O_3$ | 324 | 336 | 345 |
| Manufacturing Example 4 | $Pd/LaAl_{0.8}Ti_{0.2}O_3$ | 320 | 330 | 380 |
| Manufacturing Example 5 | $Pd/LaAl_{0.8}Nb_{0.2}O_3$ | 328 | 338 | 368 |
| Manufacturing Example 6 | $Pd/LaAl_{0.8}Zn_{0.2}O_3$ | 324 | 339 | 323 |
| Manufacturing Example 7 | $Pd/LaAl_{0.8}Ga_{0.2}O_3$ | 321 | 331 | 337 |
| Manufacturing Example 8 | $Pd/LaAl_{0.8}Ge_{0.2}O_3$ | 333 | 342 | 386 |
| Manufacturing Example 9 | $Pd/NdAl_{0.8}Mg_{0.2}O_3$ | 310 | 328 | 313 |
| Manufacturing Example 10 | $Pd/Al_2O_3$ | 330 | 345 | >400 |
| Manufacturing Example 11 | $Pd/GdAl_{0.8}Mg_{0.2}O_3$ | 352 | 348 | 392 |
| Manufacturing Example 12 | $Pd/LaAl_{0.8}Mn_{0.2}O_3$ | 345 | 357 | >400 |
| Manufacturing Example 13 | $Pd/LaAl_{0.8}Cu_{0.2}O_3$ | 316 | 337 | >400 |
| Manufacturing Example 14 | $Pd/LaAl_{0.8}Mg_{0.2}O_3$ | 360 | 359 | >400 |

TABLE 4

| | | Purification Rate at 400° C.(%) | | |
|---|---|---|---|---|
| | | CO | HC | NO |
| Manufacturing Example 1 | Pd/LaAl$_{0.8}$Mg$_{0.2}$O$_3$ | 73.9 | 94.5 | 63.5 |
| Manufacturing Example 2 | Pd/LaAl$_{0.8}$Li$_{0.2}$O$_3$ | 72.4 | 92.6 | 61.1 |
| Manufacturing Example 3 | Pd/LaAl$_{0.8}$Sc$_{0.2}$O$_3$ | 72.4 | 90.9 | 57.4 |
| Manufacturing Example 4 | Pd/LaAl$_{0.8}$Ti$_{0.2}$O$_3$ | 72.2 | 92.5 | 53.0 |
| Manufacturing Example 5 | Pd/LaAl$_{0.8}$Nb$_{0.2}$O$_3$ | 73.2 | 92.1 | 56.5 |
| Manufacturing Example 6 | Pd/LaAl$_{0.8}$Zn$_{0.2}$O$_3$ | 70.5 | 89.5 | 60.3 |
| Manufacturing Example 7 | Pd/LaAl$_{0.8}$Ga$_{0.2}$O$_3$ | 71.7 | 93.3 | 58.9 |
| Manufacturing Example 8 | Pd/LaAl$_{0.8}$Ge$_{0.2}$O$_3$ | 71.5 | 91.7 | 53.7 |
| Manufacturing Example 9 | Pd/NdAl$_{0.8}$Mg$_{0.2}$O$_3$ | 73.5 | 93.3 | 62.5 |
| Manufacturing Example 10 | Pd/Al$_2$O$_3$ | 70.2 | 90.1 | 48.2 |
| Manufacturing Example 11 | Pd/GdAl$_{0.8}$Mg$_{0.2}$O$_3$ | 69.2 | 88.2 | 51.1 |
| Manufacturing Example 12 | Pd/LaAl$_{0.8}$Mn$_{0.2}$O$_3$ | 66.9 | 81.4 | 47.4 |
| Manufacturing Example 13 | Pd/LaAl$_{0.8}$Cu$_{0.2}$O$_3$ | 70.6 | 93.8 | 48.0 |
| Manufacturing Example 14 | Pd/LaAl$_{0.8}$Mg$_{0.2}$O$_3$ | 55.2 | 89.9 | 46.5 |

MANUFACTURING EXAMPLE 2

In the same manner as in Manufacturing Example 1, Pd/LaAl$_{0.8}$Li$_{0.2}$O$_3$ was manufactured, and various estimates of activity were performed. The results are shown in Table 1 to Table 4.

MANUFACTURING EXAMPLE 3

In the same manner as in Manufacturing Example 1, Pd/LaAl$_{0.8}$Sc$_{0.2}$O$_3$ was manufactured, and various estimates of activity were performed. The results are shown in Tables 1 to 4.

MANUFACTURING EXAMPLE 4

In the same manner as in Manufacturing Example 1, Pd/LaAl$_{0.8}$Ti$_{0.2}$O$_3$ was manufactured, and various estimates of activity were performed. The results are shown in Tables 1 to 4.

MANUFACTURING EXAMPLE 5

In the same manner as in Manufacturing Example 1, Pd/LaAl$_{0.8}$Nb$_{0.2}$O$_3$ was manufactured, and various estimates of activity were performed. The results are shown in Tables 1 to 4.

MANUFACTURING EXAMPLE 6

In the same manner as in Manufacturing Example 1, Pd/LaAl$_{0.8}$Zn$_{0.2}$O$_3$ was manufactured, and various estimates of activity were performed. The results are shown in Tables 1 to 4.

MANUFACTURING EXAMPLE 7

In the same manner as in Manufacturing Example 1, Pd/LaAl$_{0.8}$Ga$_{0.2}$O$_3$ was manufactured, and various estimates of activity were performed. The results are shown in Tables 1 to 4.

MANUFACTURING EXAMPLE 8

In the same manner as in Manufacturing Example 1, Pd/LaAl$_{0.8}$Ge$_{0.2}$O$_3$ was manufactured, and various estimates of activity were performed. The results are shown in Tables 1 to 4.

MANUFACTURING EXAMPLE 9

In the same manner as in Manufacturing Example 1, Pd/NdAl$_{0.8}$Mg$_{0.2}$O$_3$ was manufactured, and various estimates of activity were performed. The results are shown in Tables 1 to 4.

MANUFACTURING EXAMPLE 10

In the same manner as in Manufacturing Example 1, Pd/Al$_2$O$_3$ was manufactured, and various estimates of activity were performed. The results are shown in Tables 1 to 4.

MANUFACTURING EXAMPLE 11

In the same manner as in Manufacturing Example 1, Pd/GdAl$_{0.8}$Mg$_{0.2}$O$_3$ was manufactured, and various estimates of activity were performed. The results are shown in Tables 1 to 4.

MANUFACTURING EXAMPLE 12

In the same manner as in Manufacturing Example 1, Pd/LaAl$_{0.8}$Mn$_{0.2}$O$_3$ was manufactured, and various estimates of activity were performed. The results are shown in Tables 1 to 4.

MANUFACTURING EXAMPLE 13

In the same manner as in Manufacturing Example 1, Pd/LaAl$_{0.8}$Cu$_{0.2}$O$_3$ was manufactured, and various estimates of activity were performed. The results are shown in Tables 1 to 4.

MANUFACTURING EXAMPLE 14

Predetermined amounts of lanthanum oxide and aluminum oxide were mixed using a mortar and pestle, the mixed sample was transferred to an aluminum crucible, the sample was heated for 10 hours at 1100° C. in a muffle kiln, and LaAl$_{0.8}$Mg$_{0.2}$O$_3$ was obtained by solid-phase reaction. Various estimates of activity in the purification catalyst were then performed. The results are shown in Tables 1 to 4.

According to the Table 1 to 4, the purification catalysts for exhaust gas in the Manufacturing Examples 1 to 9 exhibited excellent temperatures at which CO, HC, and NO are reduced by 50% at all times before and after the endurance running. Furthermore, the purification catalysts for exhaust gas in the Manufacturing Examples 1 to 9 exhibit excellent purification rates at all times before and after the endurance running. The reason for this is as follows. The purification catalysts for exhaust gas in the Manufacturing Examples 1 to 9 are made by supporting Pd on the Al composite oxide having a rational formula of LnAl$_{1-x}$M$_x$O$_3$ (Ln is a rare-earth material). Therefore, these catalysts have a property of suppressing a reduction of PdO to Pd under high temperature conditions, whereby high activity can be maintained during running after exposing the catalyst to high temperature conditions. Moreover, in these catalysts, an element whose ion diameter is different from that of Al is solved in a B site in the perovskite. Therefore, distortion of crystal structure is generated, and electrical instability is increased, whereby interaction of the supported Pd and the perovskite is increased, resulting in obtaining the high activity. Moreover, in the purification catalysts for exhaust gas in the Manufacturing Example 1 to 9, element M in the LnAl$_{1-x}$M$_x$O$_3$ (Ln is a rare earth element) is one of elements in groups 1 to 5 and groups 12 to 14, whereby the high activity effect can be realized at a high level. Additionally, in the purification catalysts for exhaust gas in the Manufacturing Examples 1 to 9, the crystal system of Al composite oxides is trigonal or rhombohedral, and most of the B site of perovskite is Al, and hence the electrical instability is great. Therefore, electron fluctuation of PdO adjacent to Al composite oxides is larger than that of PdO which exists independently. Furthermore, in the purification catalysts for exhaust gas in the Manufacturing Examples 1 to 9, when manufacturing Al composite oxides, Al composite oxides are produced in a single phase by a process of once obtaining carboxylic complex polymer by evaporating and solidifying the aqueous nitrate solution or the aqueous chloride solution which is a component containing carboxylic acid, and when supporting PdO, the surface state is likely to interact with PdO. In the process of manufacturing the mixed aqueous solution, malic acid is used, but the same effects are obtained by using citric acid or oxalic acid.

On the other hand, in the purification catalysts for exhaust gas in the Manufacturing Examples 10 to 14, sufficient performance cannot be obtained before and after the endurance running as compared with the purification catalysts for exhaust gas in Manufacturing Examples 1 to 9, and the reason is as follows. In Manufacturing Example 10, $Al_2O_3$ is a stable compound, and it does not interact with the supported precious metal Pd, whereby the Pd itself is not enhanced in activity. In the purification catalyst for exhaust gas in Manufacturing Example 11, the crystal system of Al composite oxide is orthorhombic, whereby the electron state among constituent atoms is not unstable compared with the electron state among constituent atoms in the trigonal system or rhombohedral system, resulting in not obtaining high activity. In the purification catalysts for exhaust gas in Manufacturing Examples 12 and 13, since element M in the $LnAl_{1-x}M_xO_3$ (Ln is a rare earth element) is not one of elements in groups 1 to 5 and groups 12 to 14, distortion of crystal structure generated by solving an element whose ion diameter is different from that of Al in a B site in the perovskite is small, whereby the electrical instability is not large. Therefore, interaction of the supported Pd and the perovskite is small, resulting in not obtaining the high activity. In the purification catalysts for exhaust gas in Manufacturing Examples 14, although the crystal system of Al composite oxide is trigonal or rhombohedral, carboxylic acid is not used in the manufacturing process of catalyst, $LaAl_{0.8}Mg_{0.2}O_3$ because a single phase cannot be synthesized. Therefore, sufficient surface-to-weight ratio is not obtained, and the crystal lattice surface cannot be used in an active state.

What is claimed is:

1. A method for production of a purification catalyst for exhaust gas, in which Pd is supported on an aluminum composite oxide having the formula $LnAl_{1-x}M_xO_3$ in which Ln is a rare-earth element, and the element M is one element selected from groups 1 to 5 and groups 12 to 14, wherein X is not 0 or 1, the method comprising:
   preparing an aqueous nitrate solution or aqueous chloride solution of elements forming the aluminum composite oxide; and
   adding at least one compound selected from the group consisting of compounds of a carboxylic acid of carbon number 3 to 20 and having a hydroxyl group or a mercapto group, a dicarboxylic acid having a carbon number of 2 or 3, and a monocarboxylic acid having a carbon number of 1 to 20 to the aqueous nitrate solution or aqueous chloride solution.

2. The method for production of a purification catalyst for exhaust gas according to claim 1, the method further comprising:
   evaporating the aqueous nitrate solution or aqueous chloride solution completely to produce a carboxylic acid complex polymer; and
   heating the carboxylie acid complex polymer.

3. The method for production of a purification catalyst for exhaust gas according to claim 2, wherein the heating is carried out at a temperature of not more than 1000° C.

* * * * *